(12) United States Patent
Hsu Liu et al.

(10) Patent No.: US 11,677,721 B2
(45) Date of Patent: Jun. 13, 2023

(54) PACKET TRANSMISSION METHOD USING PROXY SERVER AND SYSTEM THEREOF

(71) Applicant: Fu-Hau Hsu, Taichung (TW)

(72) Inventors: Yim-Mei Hsu Liu, Taipei (TW);
Chia-Hao Lee, Kaohsiung (TW);
Chia-Jung Wu, Kaohsiung (TW)

(73) Assignee: Fu-Hau Hsu, Taichung (TW)

( * ) Notice: Subject to any disclaimer, the term of this patent is extended or adjusted under 35 U.S.C. 154(b) by 245 days.

(21) Appl. No.: 16/984,172

(22) Filed: Aug. 4, 2020

(65) Prior Publication Data

US 2021/0044570 A1 Feb. 11, 2021

(30) Foreign Application Priority Data

Aug. 7, 2019 (TW) ................................. 108128140

(51) Int. Cl.
*H04L 45/74* (2022.01)
*H04L 9/40* (2022.01)
*H04L 12/66* (2006.01)
*H04L 67/56* (2022.01)

(52) U.S. Cl.
CPC .......... *H04L 63/0281* (2013.01); *H04L 12/66* (2013.01); *H04L 45/74* (2013.01); *H04L 63/0236* (2013.01); *H04L 63/1416* (2013.01); *H04L 67/56* (2022.05)

(58) Field of Classification Search
CPC ..... H04L 63/0281; H04L 12/66; H04L 45/74; H04L 63/0236; H04L 63/1416; H04L 67/56; H04L 45/34; H04L 63/1408; H04L 63/1458; H04L 67/563
See application file for complete search history.

(56) References Cited

U.S. PATENT DOCUMENTS

| | | | | |
|---|---|---|---|---|
| 8,340,655 | B2* | 12/2012 | Papadoglou | H04W 88/16 370/395.5 |
| 8,509,235 | B2* | 8/2013 | Li | H04L 45/00 370/428 |
| 10,447,710 | B1* | 10/2019 | Li | H04L 63/0209 |
| 11,350,339 | B1* | 5/2022 | Wong | H04W 40/248 |
| 2004/0148520 | A1* | 7/2004 | Talpade | H04L 63/0227 726/22 |
| 2006/0075114 | A1* | 4/2006 | Panasyuk | H04L 67/56 709/227 |
| 2006/0161983 | A1* | 7/2006 | Cothrell | H04L 63/1408 726/23 |
| 2015/0163236 | A1* | 6/2015 | Niemela | H04L 63/1483 726/23 |
| 2016/0094467 | A1* | 3/2016 | Hong | H04L 63/0281 370/235 |

(Continued)

*Primary Examiner* — Aftab N. Khan
(74) *Attorney, Agent, or Firm* — CKC & Partners Co., LLC (57) ABSTRACT

A packet transmission method is disclosed herein. The packet transmission method includes the following operations. The first packet is transmitted to a first proxy server terminal by a first user terminal. A header of received first packet is changed to generate a first header, and the first packet with the first header is transmitted to a gateway terminal by the first proxy server terminal. The first header of the received first packet is changed to generate a second header, and the first packet with the second header is transmitted to a server terminal by the gateway terminal. The header of the first packet includes a source address field and a destination address field.

12 Claims, 11 Drawing Sheets

(56) References Cited

U.S. PATENT DOCUMENTS

2017/0374088 A1* 12/2017 Pappu .................. H04L 61/4511
2018/0375762 A1* 12/2018 Bansal .................... H04L 47/70
2020/0351309 A1* 11/2020 Warburton ............ H04L 63/205

* cited by examiner

_PACKET TRANSMISSION METHOD USING PROXY SERVER AND SYSTEM THEREOF_

CROSS-REFERENCE TO RELATED APPLICATION

This application claims priority to Taiwan Application Serial Number 108128140, filed on Aug. 7, 2019, which is herein incorporated by reference in its entirety.

BACKGROUND

Technical Field

The present disclosure relates to a network service technique, and more particularly, to a packet transmission method and system thereof.

Description of Related Art

With the rapid development of Infrastructure as a Service (IaaS) in recent years, virtual machines (VMs) are often used to transfer packets in real time to avoid interruption of network services and affecting reliability of network services. However, when the virtual machine is under a malicious attack, data need to be transferred to another virtual machine. At this time, the packet loss problem may occur due to the large amount of transmitted data or the long transmission distance. Therefore, how to solve the risks caused by the virtual machine when transferring data, and to achieve real-time transfer of packets without affecting the reliability of network services are problems to be solved in the art.

SUMMARY

One aspect of the present disclosure is to provide a packet transmission method for transmitting a first packet from a first user terminal to a server terminal. The packet transmission method includes the following operations. The first packet is transmitted to a first proxy server terminal by the first user terminal. A header of the received first packet is changed to generate a first header, and the first packet with the first header is transmitted to a gateway terminal by the first proxy server terminal. The first header of the received first packet is changed to generate a second header, and the first packet with the second header is transmitted to the server terminal by the gateway terminal, wherein the header of the first packet includes a source address field and a destination address field.

Another aspect of the present disclosure is to provide a packet transmission system which includes a first user terminal, a first proxy server terminal, a gateway terminal, and a server terminal. The first user terminal is configured to transmit a first packet. The first proxy server terminal is in communication with the first user terminal, and configured to receive the first packet, change the header of the received first packet to generate a first header, and transmit the first packet with the first header. The gateway terminal is in communication with the first proxy server terminal, and configured to receive the first packet with the first header, change the first header of the received first packet to generate a second header, and transmit the first packet with the second header. The server terminal is in communication with the gateway terminal, and configured to receive the first packet with the second header, wherein the header of the first packet includes a source address field and a destination address field.

The packet transmission method and system of the present disclosure mainly improves the problems caused by the use of virtual machines to transfer packets in the past. When the packets are transmitted from the user terminal to the server terminal, the proxy server terminal and gateway terminal are used to transfer the packets between the user terminal and the server terminal, so as to achieve real-time transfer without causing network interruption. Furthermore, when the proxy server is under a malicious attack, the connection can also be quickly redirected to another proxy server, and there is no need to re-establish the connection between the user terminal and the server terminal, so as to achieve the effect of enhancing the user network experience.

BRIEF DESCRIPTION OF THE DRAWINGS

The present disclosure can be more fully understood by reading the following detailed description of the embodiment, with reference made to the accompanying drawings as follows.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations.

In the present disclosure, the term "coupled" may also be termed as "electrically coupled", and the term "connected" may be termed as "electrically connected". "Coupled" and "connected" may also be used to indicate that two or more elements cooperate or interact with each other. Although the terms "first," "second," etc., may be used herein to describe various elements, these terms are used to distinguish one element from another. Unless the context is clearly indicated, the term does not specifically refer to or imply the order, nor is intended to limit the present disclosure.

Figure 1:
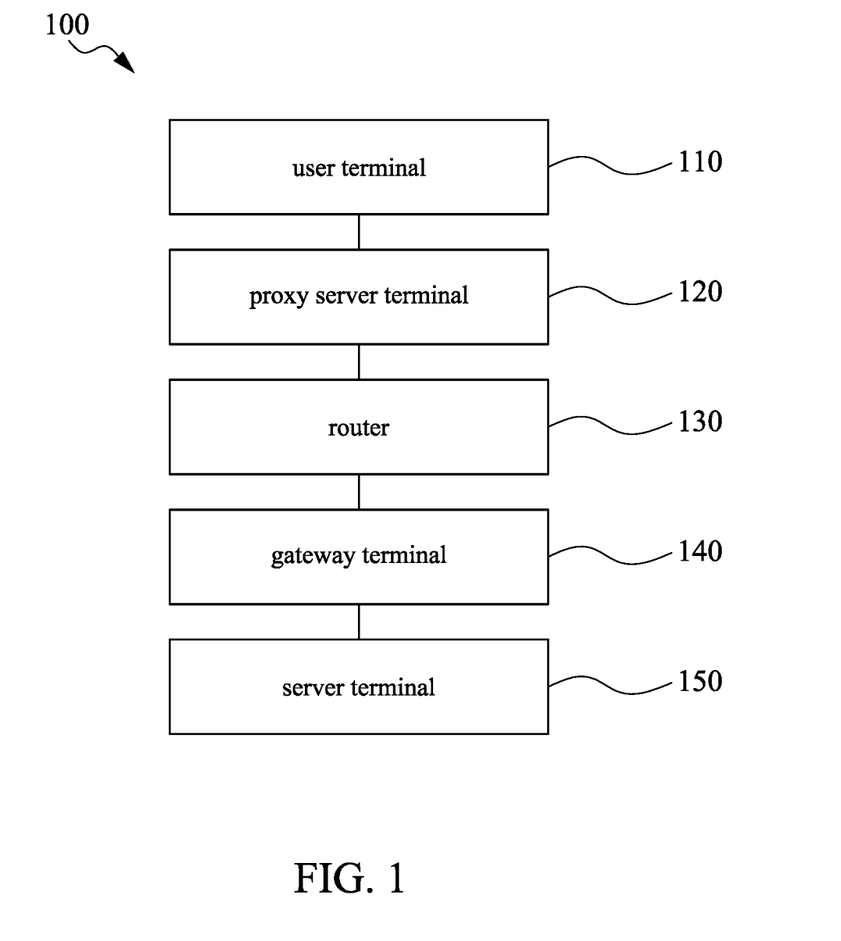
FIG. 1 illustrates a schematic diagram of a packet transmission system according to some embodiments of the present disclosure.

Reference is made to FIG. 1. FIG. 1 illustrates a schematic diagram of a packet transmission system 100 according to some embodiments of the present disclosure. As shown in FIG. 1, the packet transmission system 100 includes a user terminal 110, a proxy server terminal 120, a router 130, a gateway terminal 140, and a server terminal 150. The proxy server 120 is in communication with the user terminal 110 and the router 130, the router 130 is in communication with the proxy server 120 and the gateway terminal 140, and the gateway terminal 140 is in communication with the router 130 and the server terminal 150.

As mentioned previously, when the user terminal 110 transmits the packet to the server 150, the proxy server terminal 120 redirects the packet to the gateway 140 and the gateway terminal 140 then redirects the packet to the server terminal 150 so that real-time transfer without causing network interruption is achieved. In each embodiment of the present disclosure, the user terminal 110 may be implemented as an electronic device with a network address translation (NAT) function.

Figure 2:
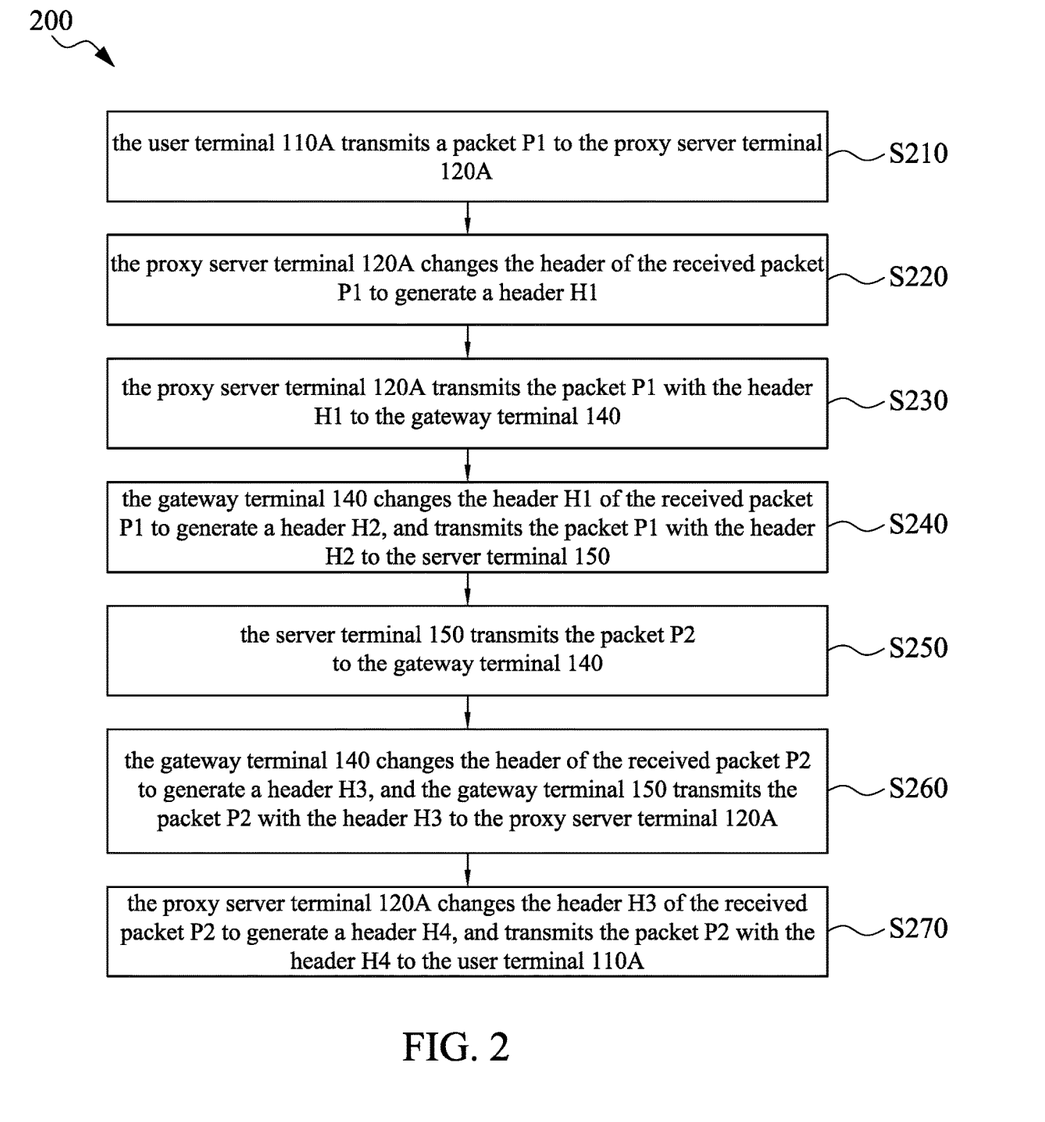
FIG. 2 illustrates a flowchart of a packet transmission method according to some embodiments of the present disclosure.

Reference is made to FIG. 2. FIG. 2 illustrates a flowchart of a packet transmission method 200 according to some embodiments of the present disclosure. In an embodiment, the packet transmission method 200 shown in FIG. 2 can be applied to the packet transmission system 100 in FIG. 1. The proxy server terminal 120 and the gateway terminal 140 are configured to transmit packets according to the following operations described in the packet transmission method 200 to achieve real-time transfer without causing network interruption.

As shown in FIG. 2, operation S210, in which the user terminal 110A transmits a packet P1 to the proxy server terminal 120A, is performed first in the packet transmission method 200. In an embodiment, the user terminal 110A in the internal network is set to transmit the packet to the server terminal 150. However, when the internal network is translated into the external network through network address translation (NAT), the packet is redirected to the proxy server terminal 120. It is worth noting that the description of the internal network of the user terminal 110 is omitted in the present disclosure, and only the operations of the user terminal 110 when connecting to the external network is explained. Therefore, the following description of the user terminal 110 can be regarded as an operation of the network address translator.

Figure 3A:
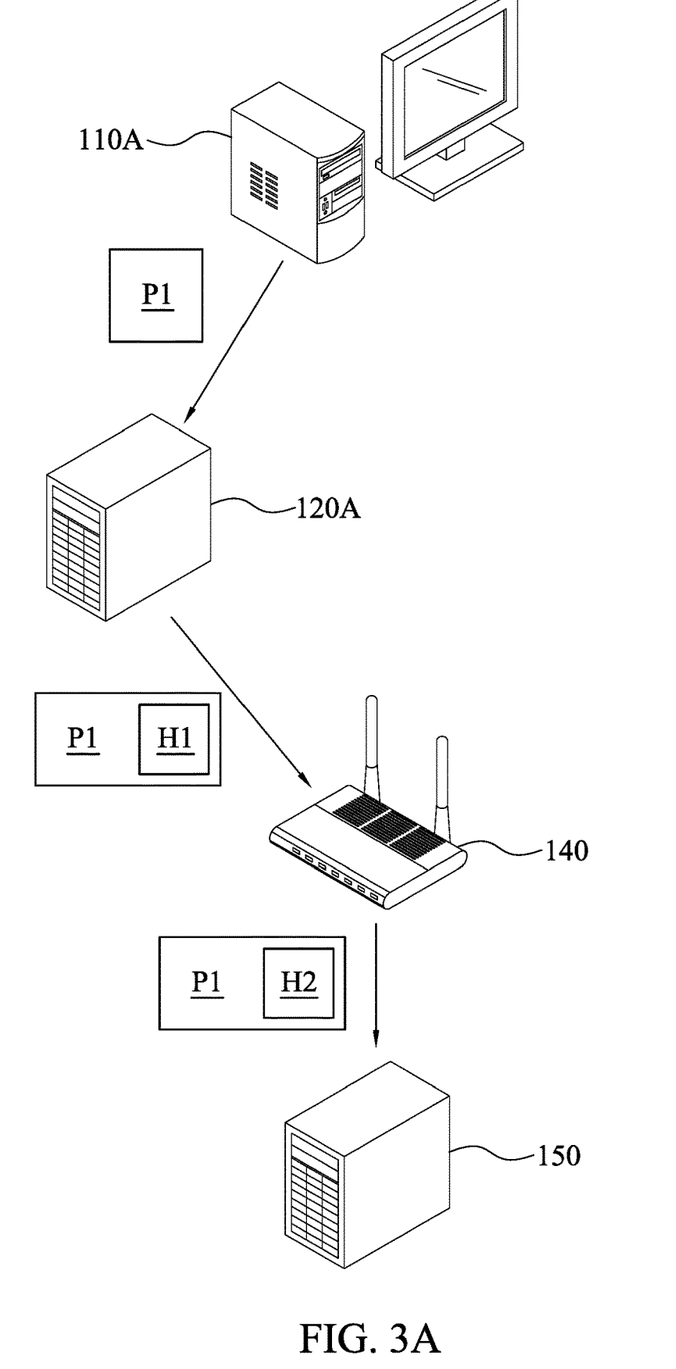
FIG. 3A illustrates a schematic diagram of an operation of transmitting a packet according to some embodiments of the present disclosure.

As mentioned above, reference is made to FIG. 3A. FIG. 3A illustrates a schematic diagram of an operation of transmitting a packet according to some embodiments of the present disclosure. As shown in FIG. 3A, the user terminal 110A transmits the packet P1 to the proxy server terminal 120A, and the header of the packet P1 includes the source address field and the destination address field. The source address field in the header of the packet P1 sent by the user terminal 110 is the Internet Protocol (IP) address of the user terminal 110A, and the destination address field therein is the IP address of the proxy server 120A. It is worth noting that the header of the packet P1 further includes other fields, such as sequence number (SEQ), acknowledgment number (ACK), and so on, and the present disclosure is not limited thereto.

As mentioned above, operation S220, in which the proxy server terminal 120A changes the header of the received packet P1 to generate a header H1, is executed next in the packet transmission method 200. As shown in FIG. 3A, after receiving the packet P1, the proxy server terminal 120A changes the source address field and the destination address field in the header of the packet P1 to generate the header H1. The source address field in the header H1 is the IP address of the proxy server terminal 120A, and the destination address field therein is the IP address of the gateway terminal 140.

As mentioned above, it is worth noting that when receiving the packet transmitted from the user terminal 110A, the proxy server terminal 120A determines whether the received packet is a SYN packet. If it is the SYN packet, it means that the connection between the user terminal 110A and the proxy server terminal 120A is established for the first time, and the SYN packet is the initial packet transmitted during the three-way handshake. Therefore, when receiving the SYN packet, the proxy server terminal 120A is configured to create a first routing table. In an embodiment, the first routing table includes the IP address of the user terminal 110A and the IP address of the proxy server terminal 120A.

As mentioned above, operation S230, in which the proxy server terminal 120A transmits the packet P1 with the header H1 to the gateway terminal 140, is performed next in the packet transmission method 200. In an embodiment, when the gateway terminal 140 receives the packet transmitted from the proxy server terminal 120A, the gateway terminal 140 determines whether the received packet is the SYN packet. If it is the SYN packet, it indicates that the proxy server terminal 120A establishes the connection with the gateway terminal 140 for the first time. The SYN packet is the initial packet transmitted during the three-way handshake. Therefore, when receiving the SYN packet, the gateway terminal 140 is configured to create a second routing table. In an embodiment, the second routing table includes the IP address of the user terminal 110A and the IP address of the proxy server terminal 120A.

As mentioned above, operation S240, in which the gateway terminal 140 changes the header H1 of the received packet P1 to generate a header H2, and transmits the packet P1 with the header H2 to the server terminal 150, is performed next in the packet transmission method 200. In an embodiment, as shown in FIG. 3A, after receiving the packet P1, the gateway terminal 140 changes the source address field and the destination address field in the header H1 of the packet P1 according to the second routing table to generate the header H2. The source address field in the header H2 is the IP address of user terminal 110A, and the destination address field therein is the IP address of server terminal 150.

As mentioned above, the gateway terminal 140 transmits the packet P1 with the header H2 to the server terminal 150. Since the source address field of the header H2 is changed by the gateway terminal 140 to be the IP address of the user terminal 110A, the server terminal 150 considers the packet P1 to be the packet sent by the user terminal 110A.

Figure 3B:
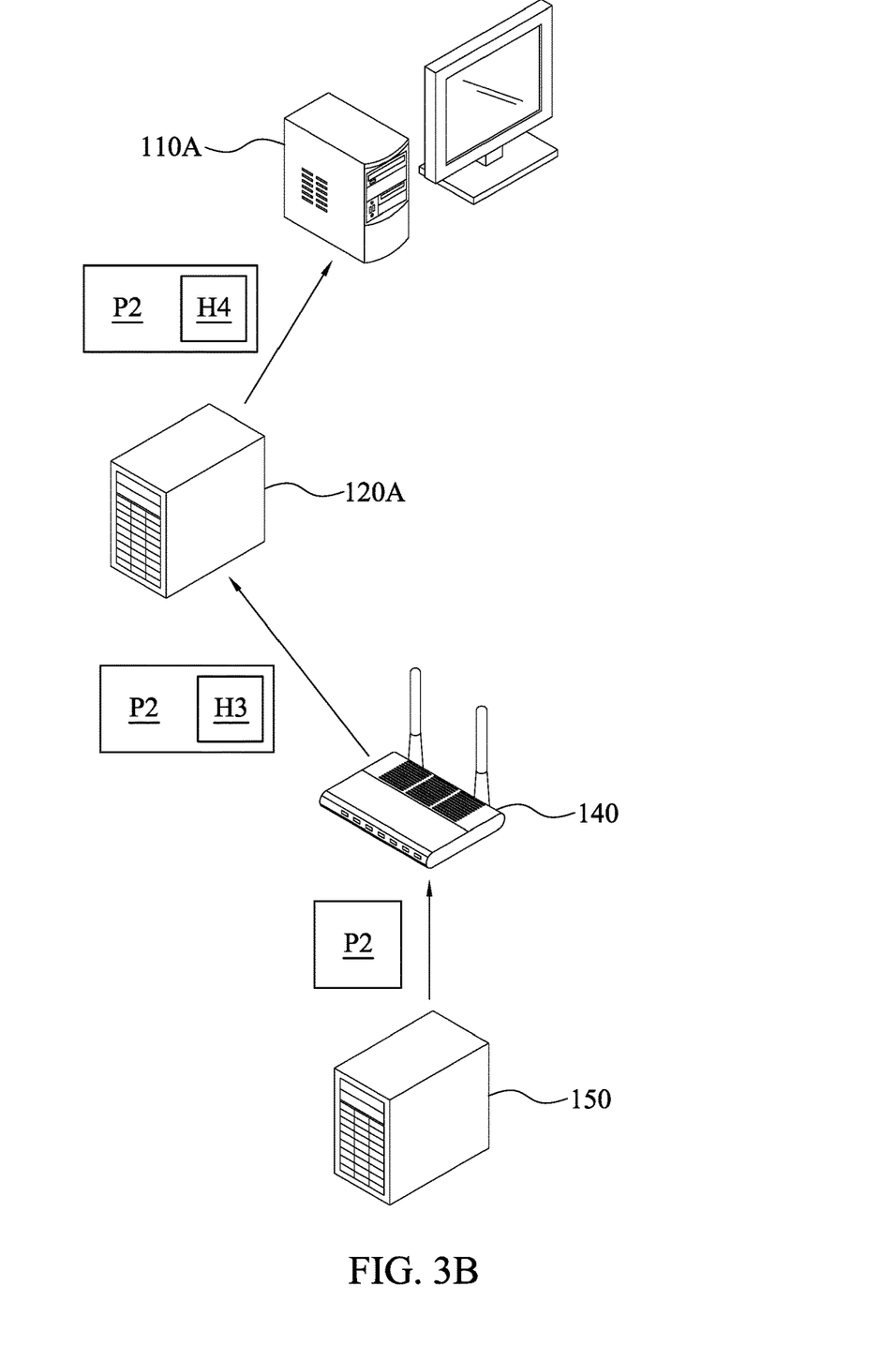
FIG. 3B illustrates a schematic diagram of an operation of transmitting a packet according to some embodiments of the present disclosure.

As mentioned above, operation S250, in which the server terminal 150 transmits the packet P2 to the gateway terminal 140, is performed next in the packet transmission method 200. Reference is made to FIG. 3B. FIG. 3B illustrates a schematic diagram of an operation of transmitting a packet according to some embodiments of the present disclosure. As shown in FIG. 3B, although the packet P2 is transmitted to the gateway terminal 140 by the server terminal 150, in the setting of the header of the packet P2, the source address field is the IP address of the server terminal 150 and the destination address field is the IP address of the user terminal 110A. Accordingly, in fact, the packet P2 is transmitted to the user terminal 110A by the server terminal 150.

As mentioned above, operation S260, in which the gateway terminal 140 changes the header of the received packet P2 to generate a header H3, and the gateway terminal 150 transmits the packet P2 with the header H3 to the proxy server terminal 120A, is performed next in the packet transmission method 200. As shown in FIG. 3B, after receiving the packet P2, the gateway terminal 140 changes the source address field and the destination address field in the header of the packet P2 according to the second routing table to generate the header H3. The source address field in the header H3 is the IP address of the gateway terminal 140, and the destination address field therein is the IP address of the proxy server terminal 120A. Next, the gateway terminal 140 transmits the packet P2 with the header H3 to the proxy server terminal 120A.

As mentioned above, operation S270, in which the proxy server terminal 120A changes the header H3 of the received packet P2 to generate a header H4, and transmits the packet P2 with the header H4 to the user terminal 110A, is performed next in the packet transmission method 200. In an embodiment, after receiving the packet P2, the proxy server terminal 120A changes the source address field and the destination address field in the header H3 of the packet P2 according to the first routing table to generate the header H4. The source address field in the header H4 is the IP address of the proxy server terminal 120A, and the destination address field therein is the IP address of the user terminal 110A. Next, the proxy server terminal 120A transmits the packet P2 with the header H4 to the user terminal 110A.

Figure 4:
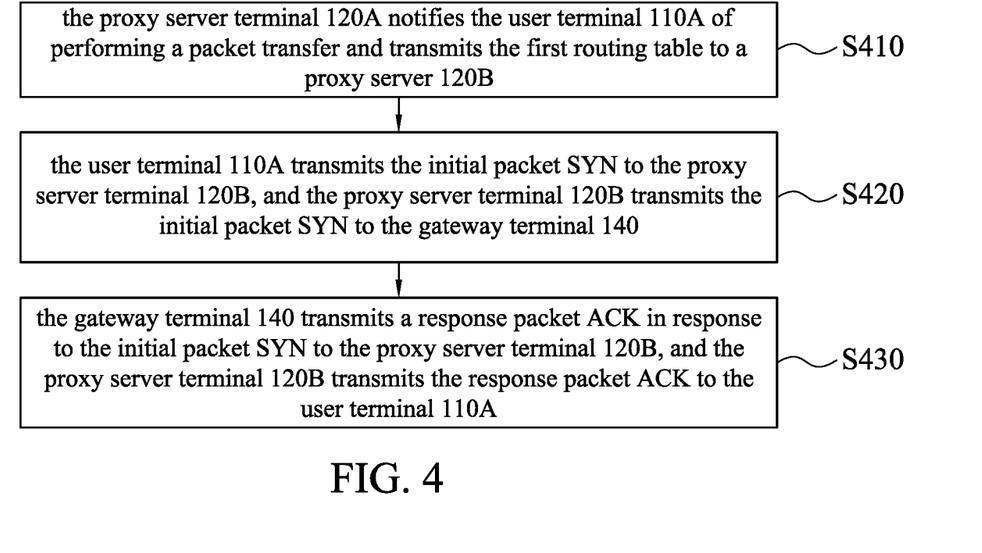
FIG. 4 illustrates a flowchart of operations of a proxy server under an attack according to some embodiments of the present disclosure.

Reference is made to FIG. 4. FIG. 4 illustrates a flowchart of operations of the proxy server under an attack according to some embodiments of the present disclosure. In an embodiment, when the proxy server terminal 120 is under a distributed denial-of-service attack (DDoS attack), it may cause the proxy server 120 to be disconnected, the network to be abnormally slow, or the like. As shown in FIG. 4, when the proxy server terminal 120 is under a DDos attack, operation S410, in which the proxy server terminal 120A notifies the user terminal 110A of performing a packet transfer and transmits the first routing table to a proxy server 120B, is first executed.

Figure 5:
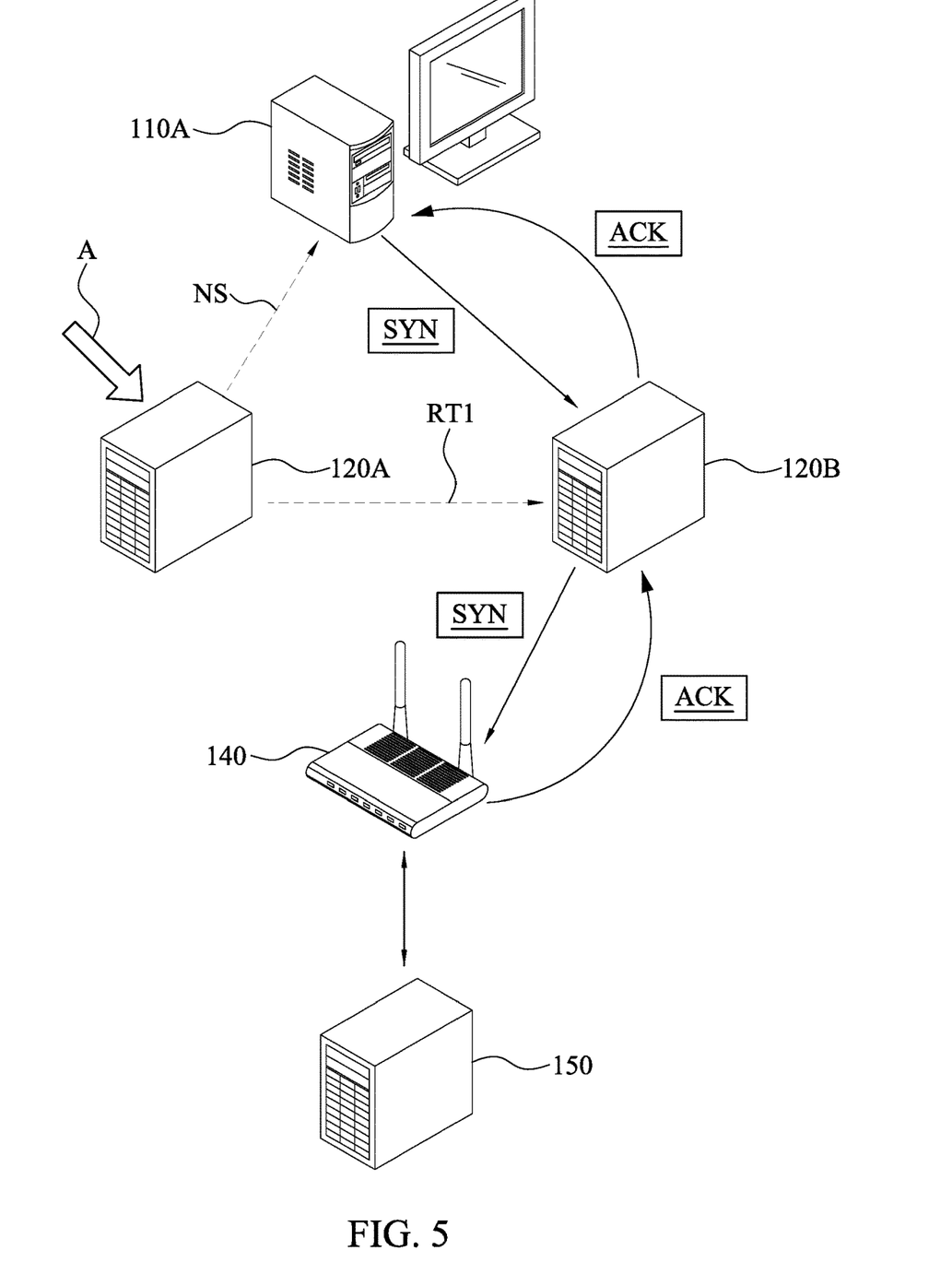
FIG. 5 illustrates a schematic diagram of an operation of transmitting a packet when an attack occurs according to some embodiments of the present disclosure.

As mentioned above, reference is made to FIG. 5. FIG. 5 illustrates a schematic diagram of an operation of transmitting a packet when an attack occurs according to some embodiments of the present disclosure. As shown in FIG. 5, when a DDoS attack event A occurs on the proxy server terminal 120A, the proxy server terminal 120A sends a notification signal NS to the user terminal 110A, and transmits the first routing table RT1 to the proxy server terminal 120B. It is worth noting that the notification signal NS is configured to not only notify the user terminal 110A that the attack event A occurs, but also notify the user terminal 110A that the connection thereof is transferred to the proxy server terminal 120B. It is worth noting that when the proxy server terminal 120A is under the attack, it is the proxy server terminal 120A that determines to transfer the connection to other default proxy server terminals.

As mentioned above, in another embodiment, when the proxy server terminal is attacked, the administrator can also transfer the connection to other proxy server terminal through a control interface. In yet another embodiment, when the proxy server terminal is under an attack, the proxy server terminal 120A can automatically search for other proxy server terminals to which the connection can be transferred (e.g., the proxy server terminal 120B or the proxy server terminal 120C), and it is not limited to a specific proxy server terminal.

As mentioned above, in an embodiment, after detecting the DDoS attack event, the proxy server 120A can use a portable operating system interface (POSIX) signal to inform the user terminal 110A that the the connection is transferred. It is worth noting that other methods can also be used to notify the user terminal 110A of transferring the connection, and the present disclosure is not limited thereto.

Next, operation S420, in which the user terminal 110A transmits the initial packet SYN to the proxy server terminal 120B, and the proxy server terminal 120B transmits the initial packet SYN to the gateway terminal 140, is performed. In an embodiment, since the user terminal 110A, the proxy server terminal 120B, and the gateway terminal 140 have not established the connection therebetween before, the three-way handshake is required after the connection is transferred to the proxy server terminal 120B. It is worth noting that the user terminal 110A and the server terminal 150 do not know that the present connection has been transferred. Accordingly, the router is not allowed to transmit the packet until the three-way handshake between the user terminal 110A, the proxy server terminal 120B, and the gateway terminal 140 is performed.

In an embodiment, the header of the initial packet SYN includes the source address field, the destination address field, and the flag field. The source address field in the header of the initial packet SYN transmitted by the user terminal 110A is the IP address of the user terminal 110A, the destination address field therein is the IP address of the proxy server terminal 120B, and the flag field therein is "Synchronize" (S). Next, the proxy server terminal 120B changes the header of the initial packet SYN according to the received first routing table RT1 and sends it to the gateway terminal 140. The source address field in the changed header is the IP address of the proxy server terminal 120B, the destination address field therein is the IP address of the gateway terminal 140, and the flag field therein is "S".

Next, operation S430, in which the gateway terminal 140 transmits a response packet ACK in response to the initial packet SYN to the proxy server terminal 120B, and the proxy server terminal 120B transmits the response packet ACK to the user terminal 110A, is performed. In an embodiment, after receiving the initial packet SYN, the gateway terminal 140 needs to return the response packet ACK, and the header of the response packet ACK includes the source address field, the destination address field, and the flag field. The source address field in the header of the response packet ACK sent by the gateway terminal 140 is the IP address of the gateway terminal 140, the destination address field therein is the IP address of the proxy server terminal 120B, and the flag field therein is "Acknowledge" (A).

As mentioned above, the proxy server terminal 120B changes the header of the response packet ACK according to the received first routing table RT1 and sends it to the user terminal 110A. The source address field in the changed header is the IP address of the proxy server terminal 120B, the destination address field therein is the IP address of the user terminal 110A, and the flag field therein is "A". In this way, when the user terminal 110A receives the response packet ACK, it indicates that the three-way handshake between the user terminal 110A, the proxy server terminal 120B, and the gateway terminal 140 has been completed, and data can be transmitted between the user terminal 110A, the proxy server terminal 120B, the gateway terminal 140, and the server terminal 150.

As mentioned above, the data transmission method between the user terminal 110A, the proxy server terminal 120B, the gateway terminal 140, and the server terminal 150 is the same as operations S210-S270, and the further description is not given herein. In this way, packets can be continuously transmitted between the user terminal 110A and the server terminal 150 through the proxy server terminal 120B. Therefore, even if the proxy server 120A suffers from the malicious attack, the connection is not interrupted to affect the user experience quality.

In another embodiment, there might be a malicious user among the users who carries out the DDoS attack on the proxy server terminal 120 to cause the disconnection or abnormally-slow network. Therefore, if the proxy server terminal 120 determines that there is a malicious user, it has to actively disconnect the malicious user to prevent the bandwidth of the proxy server terminal 120 from being completely occupied.

Figure 6:
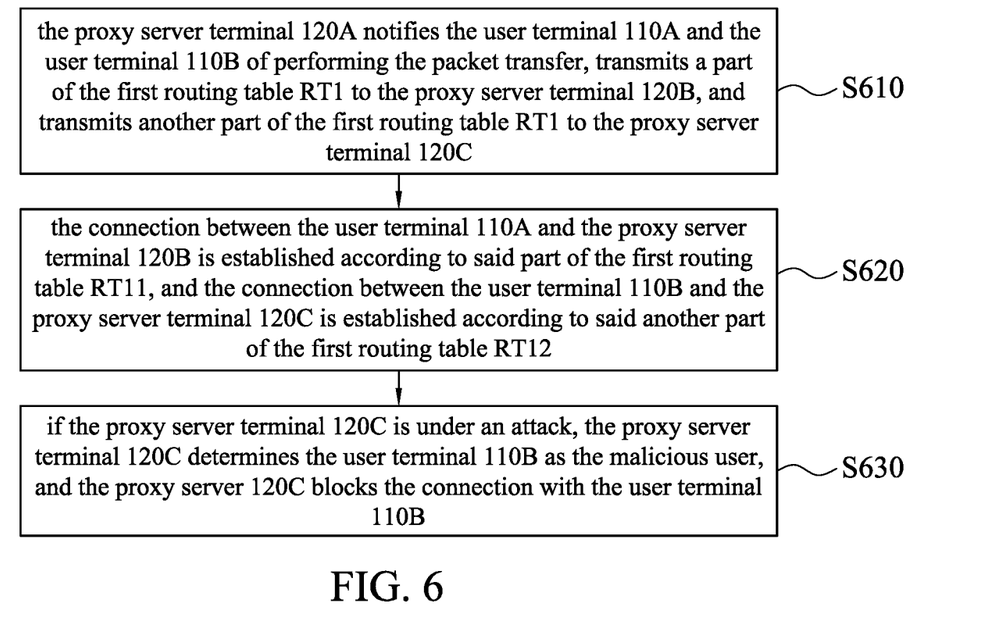
FIG. 6 illustrates a flowchart of operations of a proxy server under an attack according to some embodiments of the present disclosure.

Reference is made to FIG. 6. FIG. 6 illustrates a flowchart of operations of the proxy server under an attack according to some embodiments of the present disclosure. As shown in FIG. 6, when the proxy server terminal 120A is under a DDoS attack, operation S610, in which the proxy server terminal 120A notifies the user terminal 110A and the user terminal 1106 of performing the packet transfer, transmits a part of the first routing table RT1 to the proxy server terminal 120B, and transmits another part of the first routing table RT1 to the proxy server terminal 120C, is executed first.

Figure 7A:
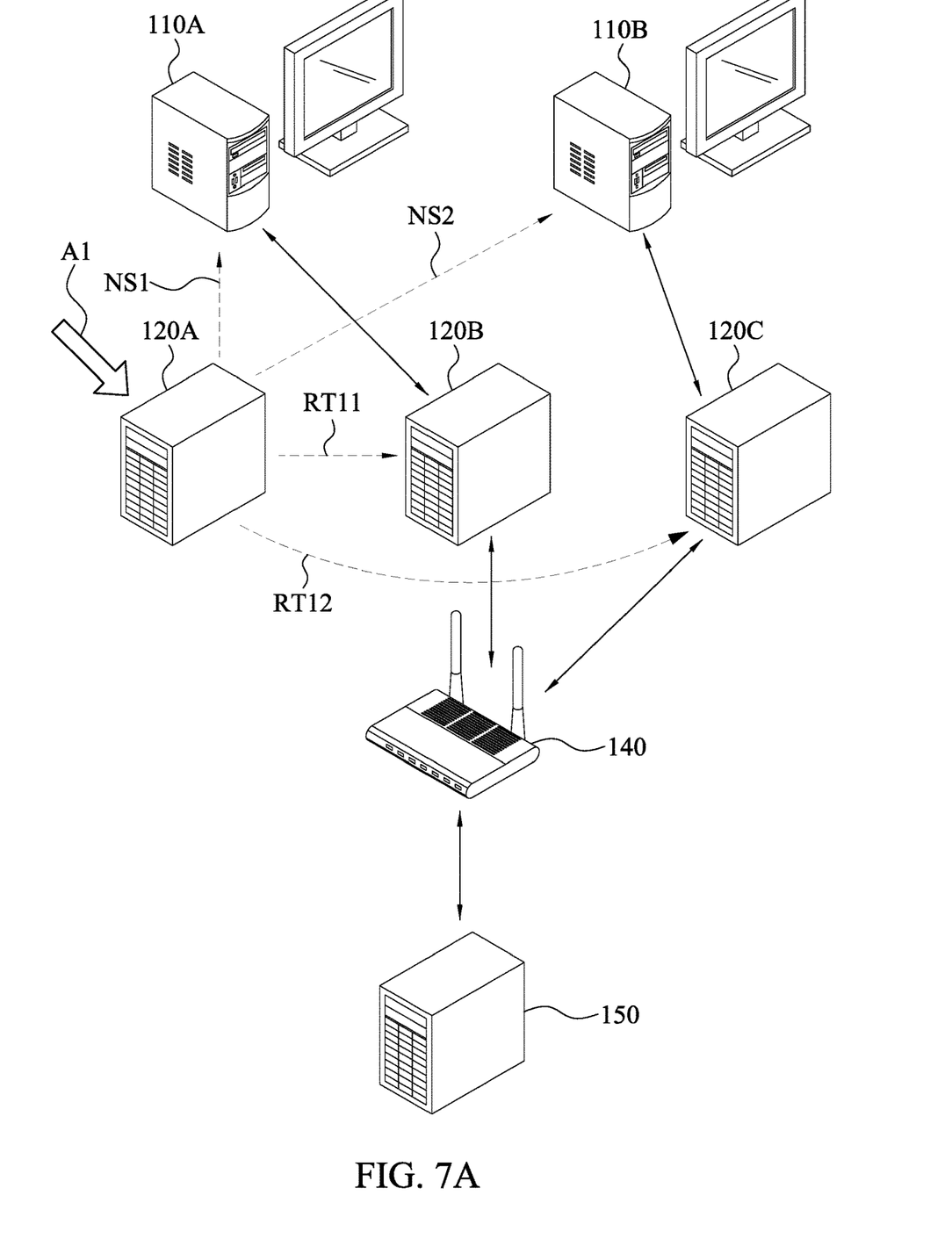
FIG. 7A illustrates a schematic diagram of an operation of transmitting a packet when an attack occurs according to some embodiments of the present disclosure.

Reference is made to FIG. 7A. FIG. 7A is a schematic diagram of an operation of transmitting a packet when an attack occurs according to some embodiments of the present disclosure. As shown in FIG. 7A, when a DDoS attack event A1 occurs on the proxy server terminal 120A, the proxy server terminal 120A transmits a notification signal NS1 to the user terminal 110A, and transmits a notification signal NS2 to the user terminal 1106. Next, a part of the first routing table RT11 is sent to the proxy server terminal 120B, and another part of the first routing table RT12 is sent to the proxy server terminal 120C. It is worth noting that the notification signals NS1 and NS2 not only notify the user terminal 110A of the attack event A1, but also respectively notify the user terminal 110A and the user terminal 1106 that the connection is transferred to the proxy server terminal 120B and the proxy server terminal 120C.

Operation S620, in which the connection between the user terminal 110A and the proxy server terminal 120B is established according to said part of the first routing table RT11, and the connection between the user terminal 1106 and the proxy server terminal 120C is established according to said another part of the first routing table RT12, is performed. In an embodiment, since the user terminal 110A, the proxy server terminal 120B, and the gateway terminal 140 have not established the connection therebetween before and the user terminal 1106, the proxy server 120C, and the gateway terminal 140 have not established the connection therebetween before, the three-way handshake is required after the connection is transferred to the proxy server terminal 120B and the proxy server terminal 120C. The method of three way handshake is described as operations S410-S430, and the further description is not provided herein.

Figure 7B:
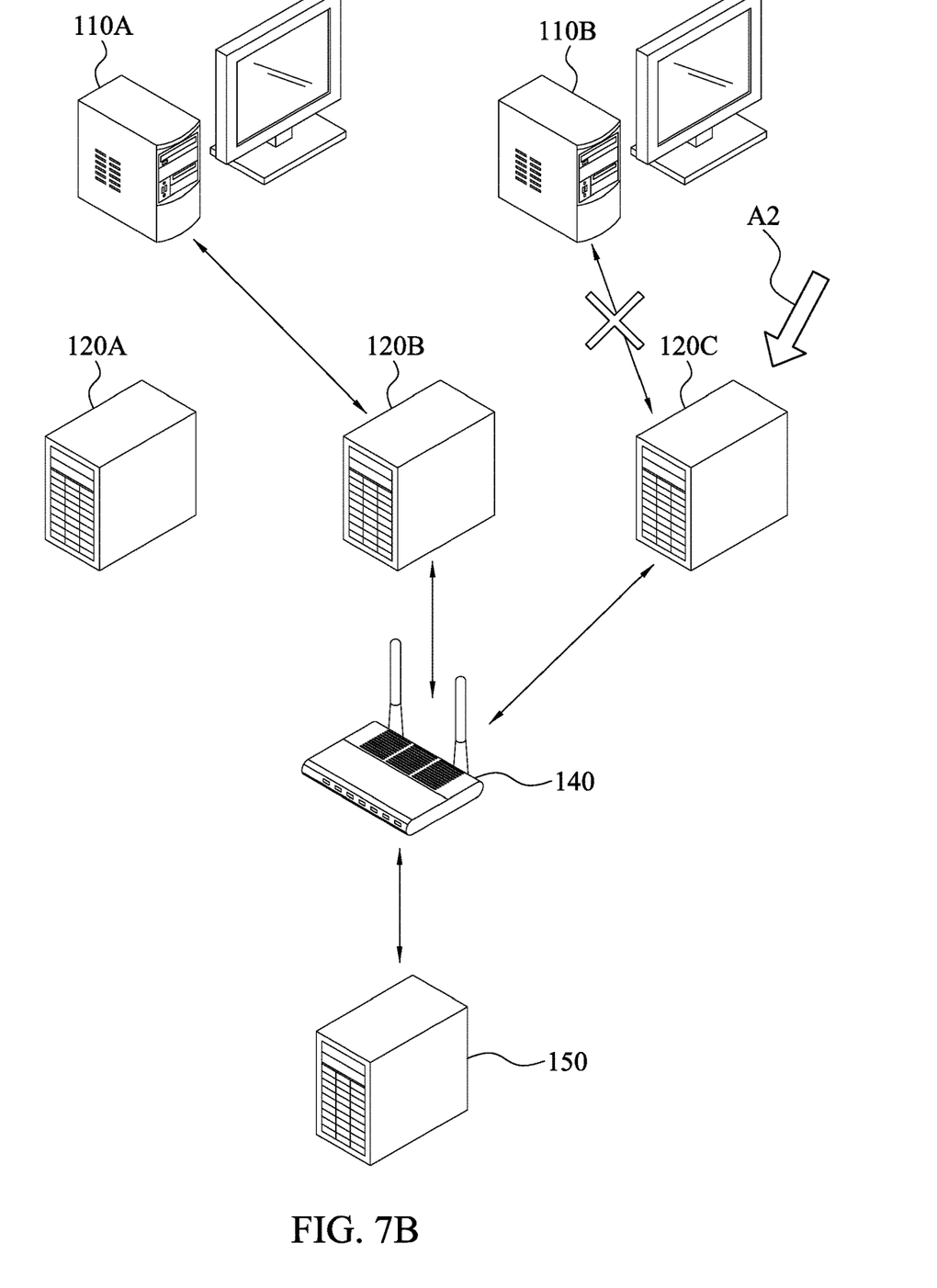
FIG. 7B illustrates a schematic diagram of an operation of transmitting a packet when an attack occurs according to some embodiments of the present disclosure.

Next, operation S630, in which if the proxy server terminal 120C is under an attack, the proxy server terminal 120C determines the user terminal 110B as the malicious user, and the proxy server 120C blocks the connection with the user terminal 110B, is performed. Reference is made to FIG. 7B. FIG. 7B illustrates a schematic diagram of an operation of transmitting a packet when an attack occurs according to some embodiments of the present disclosure. As shown in FIG. 7B, if a DDoS attack event A2 still occurs on the proxy server terminal 120C, it can determine the user terminal 110B as the malicious user at this time, and the proxy server terminal 120C can interrupt the connection with the user terminal 110B. In this way, even if the proxy server 120 is attacked by the user terminal, which is a malicious user, it does not affect the quality of the connections between other user terminals 110 and the server 150.

Figure 8:
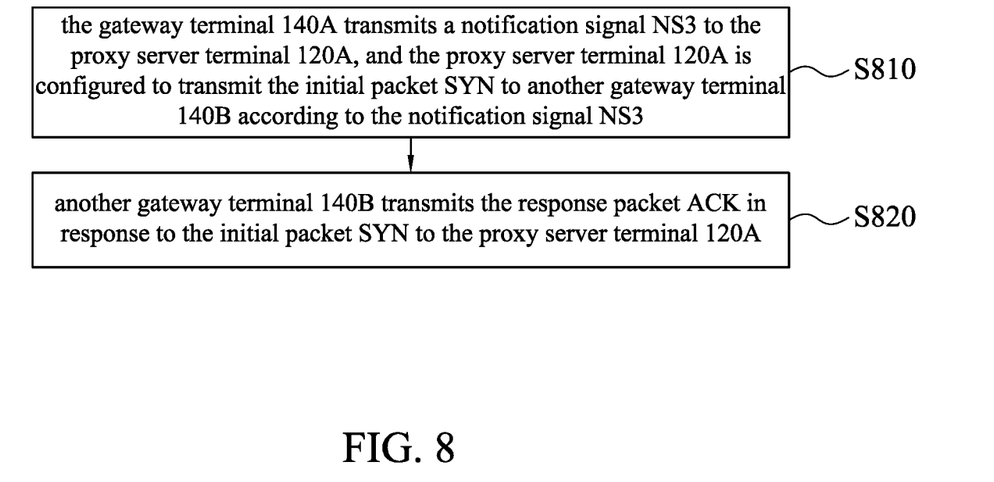
FIG. 8 illustrates a flowchart of operations of a proxy server under an attack according to some embodiments of the present disclosure.

Reference is made to FIG. 8. FIG. 8 illustrates a flowchart of operations of the proxy server under an attack according to some embodiments of the the present disclosure. As shown in FIG. 8, when the gateway terminal 140A is under a DDoS attack, operation S810, in which the gateway terminal 140A transmits a notification signal NS3 to the proxy server terminal 120A, and the proxy server terminal 120A is configured to transmit the initial packet SYN to another gateway terminal 140B according to the notification signal NS3, is executed first.

Figure 9:
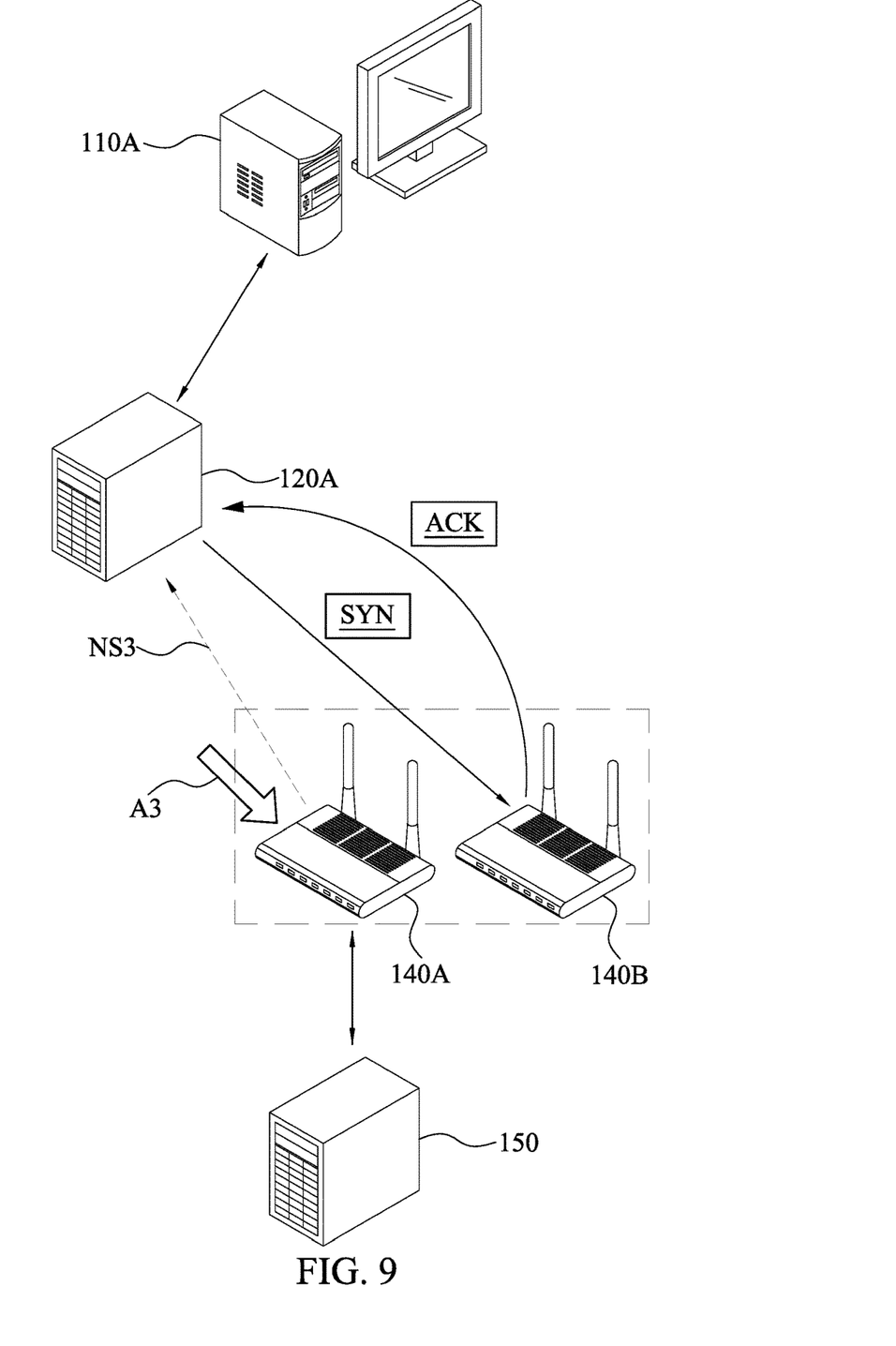
FIG. 9 illustrates a schematic diagram of an operation of transmitting a packet when an attack occurs according to some embodiments of the present disclosure.

Reference is made to FIG. 9. FIG. 9 illustrates a schematic diagram of an operation of transmitting a packet when an attack occurs according to some embodiments of the present disclosure. As shown in FIG. 9, when a DDoS attack event A3 occurs on the gateway terminal 140A, the gateway terminal 140A sends a notification signal NS3 to the proxy server terminal 120A. It is worth noting that the notification signal NS3 is configured to not only notify the proxy server terminal 120A of the attack event A3, but also notify the proxy server terminal 120A that the connection is transferred to the gateway terminal 140B.

As mentioned above, the header of the initial packet SYN includes the source address field, the destination address field, and the flag field. The source address field in the header of the initial packet SYN transmitted by the proxy server terminal 120A is the IP address of the proxy server terminal 120A, the destination address field therein is the IP address of the gateway terminal 140B, and the flag field therein is "S".

Next, operation S820, in which another gateway terminal 140B transmits the response packet ACK in response to the initial packet SYN to the proxy server terminal 120A, is executed. In an embodiment, after receiving the initial packet SYN, the gateway terminal 140B needs to return the response packet ACK, and the header of the response packet ACK includes the source address field, the destination address field, and the flag field. The source address field in the header of the response packet ACK sent by the gateway terminal 140B is the IP address of the gateway terminal 140B, the destination address field therein is the IP address of the proxy server terminal 120A and the flag field therein is "A".

As mentioned above, the connection is transferred from the gateway terminal 140A to the gateway terminal 140B, so that even if the gateway terminal 140A is under an attack, it does not affect the quality of the connection between the user terminal 110 and the server terminal 150. It is worth noting that the gateway terminal 140A and the gateway terminal 140B in FIG. 9 are only exemplary illustrations, the gateway terminal 140A and the gateway terminal 140B may be implemented by different ports on the same gateway. Therefore, the IP addresses of the two gateway terminals 140A and 140B are also different, and the present disclosure is not limited thereto.

It can be seen from the aforementioned embodiments of the present disclosure that, it mainly improves the problems caused by the use of virtual machines to transfer packets in the past. When the packets are transmitted from the user terminal to the server terminal, the proxy server terminal and gateway terminal are used to transfer the packets between the user terminal and the server terminal, so as to achieve real-time transfer without causing network interruption. Furthermore, when the proxy server is under a malicious attack, the connection can also be quickly redirected to another proxy server, and there is no need to re-establish the connection between the user terminal and the server terminal, so as to achieve the effect of enhancing the user network experience.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A packet transmission method for transmitting a first packet from a first user terminal to a server terminal, the packet transmission method comprising:
   transmitting the first packet to a first proxy server terminal by the first user terminal;
   changing a header of the received first packet to generate a first header, and transmitting the first packet with the first header to a gateway terminal by the first proxy server terminal; and
   changing the first header of the received first packet to generate a second header, and transmitting the first packet with the second header to the server terminal by the gateway terminal, wherein the header of the first packet comprises a source address field and a destination address field,
   wherein when the gateway terminal is under an attack, transmitting a notification signal to the first proxy server terminal by the gateway terminal, wherein the first proxy server terminal is configured to transmit an initial packet to another gateway terminal according to the notification signal; and transmitting a response packet in response to the initial packet to the first proxy server terminal by the another gateway terminal, and
   wherein the first proxy server terminal is configured to establish a first routing table, wherein the first routing table comprises an IP address of the first user terminal and an IP address of the first proxy server terminal, and
   when the first proxy server terminal is under an attack, notifying the first user terminal of performing a packet transfer and transmitting the first routing table to a second proxy server terminal by the first proxy server terminal;
   transmitting an initial packet to the second proxy server terminal by the first user terminal, and transmitting the initial packet to the gateway terminal by the second proxy server terminal; and
   transmitting a response packet in response to the initial packet to the second proxy server terminal by the gateway terminal, and transmitting the response packet to the first user terminal by the second proxy server terminal.

2. The packet transmission method of claim 1, wherein the source address field in the first header comprises an Internet Protocol (IP) address of the first proxy server terminal, and the destination address field in the first header comprises an IP address of the gateway terminal.

3. The packet transmission method of claim 1, wherein the source address field in the second header comprises an IP address of the user terminal, and the destination address field in the second header comprises an IP address of the server terminal.

4. The packet transmission method of claim 1, wherein the gateway terminal is configured to establish a second routing table, wherein the second routing table comprises an IP address of the first user terminal and an IP address of the first proxy server terminal.

5. The packet transmission method of claim 1, further comprising:
   transmitting a second packet to the gateway terminal by the server terminal;
   changing the header of the received second packet to generate a third header, and transmitting the second packet with the third header to the first proxy server terminal by the gateway terminal; and
   changing the third header of the received second packet to generate a fourth header, and transmitting the second packet with the fourth header to the first user terminal by the first proxy server terminal.

6. A packet transmission system, comprising:
   a first user terminal configured to transmit a first packet;
   a first proxy server terminal in communication with the first user terminal, configured to receive the first packet, change a header of the received first packet to generate a first header, and transmit the first packet with the first header;
   a gateway terminal in communication with the first proxy server terminal, configured to receive the first packet with the first header, change the first header of the received first packet to generate a second header, and transmit the first packet with the second header; and
   a server terminal in communication with the gateway terminal, configured to receive the first packet with the second header, wherein the header of the first packet comprises a source address field and a destination address field, wherein
   when the gateway terminal is under an attack, the gateway terminal is configured to transmit a notification signal to the first proxy server terminal, and the first proxy server terminal is configured to transmit an initial packet to another gateway terminal according to the notification signal; and the another gateway terminal is configured to transmit a response packet in response to the initial packet to the first proxy server terminal, wherein the first proxy server terminal is configured to establish a first routing table, wherein the first routing table comprises an IP address of the first user terminal and an IP address of the first proxy server terminal, and when the first proxy server terminal is under an attack, the first proxy server terminal is configured to notify the first user terminal of performing a packet transfer and transmit the first routing table to a second proxy server terminal;

the first user terminal is configured to transmit an initial packet to the second proxy server terminal, and the second proxy server terminal is configured to transmit the initial packet to the gateway terminal; and the gateway terminal is configured to transmit a response packet in response to the initial packet to the second proxy server terminal, and the second proxy server terminal is configured to transmit the response packet to the first user terminal.

7. The packet transmission system of claim 6, wherein the source address field in the first header comprises an IP address of the first proxy server terminal, and the destination address field in the first header comprises the IP address of the gateway terminal.

8. The packet transmission system of claim 6, wherein the source address field in the second header comprises an IP address of the first user terminal, and the destination address field in the second header comprises an IP address of the server terminal.

9. The packet transmission system of claim 6, wherein the gateway terminal is configured to establish a second routing table, wherein the second routing table comprises an IP address of the first user terminal and an IP address of the first proxy server terminal.

10. The packet transmission system of claim 6, wherein the server terminal is further configured to transmit a second packet to the gateway terminal, the gateway terminal is configured to change the header of the received second packet to generate a third header, and transmit the second packet with the third header to the first proxy server terminal; and the first proxy server terminal is further configured to change the third header of the received second packet to generate a fourth header, and transmit the second packet with the fourth header to the first user terminal.

11. A packet transmission method for transmitting a first packet from a first user terminal to a server terminal, the packet transmission method comprising:

transmitting the first packet to a first proxy server terminal by the first user terminal;

changing a header of the received first packet to generate a first header, and transmitting the first packet with the first header to a gateway terminal by the first proxy server terminal; and changing the first header of the received first packet to generate a second header, and transmitting the first packet with the second header to the server terminal by the gateway terminal, wherein the header of the first packet comprises a source address field and a destination address field, wherein when the gateway terminal is under an attack, transmitting a notification signal to the first proxy server terminal by the gateway terminal, wherein the first proxy server terminal is configured to transmit an initial packet to another gateway terminal according to the notification signal; and transmitting a response packet in response to the initial packet to the first proxy server terminal by the another gateway terminal, and wherein the first proxy server terminal is configured to establish a first routing table, wherein the first routing table comprises an IP address of the first user terminal and an IP address of the first proxy server terminal, and when the first proxy server terminal is under an attack, notifying the first user terminal and a second user terminal of performing a packet transfer, and transmitting a part of the first routing table to a second proxy server terminal and another part of the first routing table to a third proxy server terminal by the first proxy server terminal;

establishing a connection between the first user terminal and the second proxy server terminal according to the part of the first routing table, and establishing a connection between the second user terminal and the third proxy server terminal according to the another part of the first routing table; and if the third proxy server terminal is under an attack, determining the second user terminal as a malicious user terminal by the third proxy server terminal, and blocking a connection with the second user terminal by the third proxy server terminal.

12. A packet transmission system, comprising:

a first user terminal configured to transmit a first packet;

a first proxy server terminal in communication with the first user terminal, configured to receive the first packet, change a header of the received first packet to generate a first header, and transmit the first packet with the first header;

a gateway terminal in communication with the first proxy server terminal, configured to receive the first packet with the first header, change the first header of the received first packet to generate a second header, and transmit the first packet with the second header; and a server terminal in communication with the gateway terminal, configured to receive the first packet with the second header, wherein the header of the first packet comprises a source address field and a destination address field, wherein when the gateway terminal is under an attack, the gateway terminal is configured to transmit a notification signal to the first proxy server terminal, and the first proxy server terminal is configured to transmit an initial packet to another gateway terminal according to the notification signal; and the another gateway terminal is configured to transmit a response packet in response to the initial packet to the first proxy server terminal, wherein the first proxy server terminal is configured to establish a first routing table, wherein the first routing table comprises an IP address of the first user terminal and an IP address of the first proxy server terminal, and when the first proxy server terminal is under an attack, the first proxy server terminal is configured to notify the first user terminal and a second user terminal of performing a packet transfer, transmit a part of the first routing table to a second proxy server terminal, and transmit another part of the first routing table to a third proxy server terminal;

the second proxy server terminal is configured to establish a connection with the first user terminal according to the part of the first routing table, and the third proxy server terminal is configured to establish a connection with the second user terminal according to the another part of the first routing table; and if the third proxy server terminal is under an attack, the third proxy server terminal is configured to determine the second user terminal as a malicious user, and the third proxy server terminal blocks a connection with the second user terminal.

\* \* \* \* \*